(12) United States Patent
Martin

(10) Patent No.: US 11,540,666 B2
(45) Date of Patent: Jan. 3, 2023

(54) COOKING VESSEL LID WITH DRAINING AND STEAM REGULATION FUNCTIONALITY

(71) Applicant: Ariel Martin, North Bergen, NJ (US)

(72) Inventor: Ariel Martin, North Bergen, NJ (US)

( * ) Notice: Subject to any disclaimer, the term of this patent is extended or adjusted under 35 U.S.C. 154(b) by 493 days.

(21) Appl. No.: 16/654,432

(22) Filed: Oct. 16, 2019

(65) Prior Publication Data

US 2021/0113014 A1  Apr. 22, 2021

(51) Int. Cl.
*A47J 36/08* (2006.01)
*A47J 36/10* (2006.01)

(52) U.S. Cl.
CPC ............... *A47J 36/08* (2013.01); *A47J 36/10* (2013.01)

(58) Field of Classification Search
CPC ........ A47J 36/06; A47J 36/064; A47J 36/066; A47J 36/08; A47J 36/10; A47J 36/12; A47J 36/14
See application file for complete search history.

(56) References Cited

U.S. PATENT DOCUMENTS

| | | | | |
|---|---|---|---|---|
| 1,781,995 A | * | 11/1930 | Alexander | A47J 36/08 210/469 |
| 1,997,509 A | | 4/1935 | Betteridge | |
| 2,026,701 A | | 1/1936 | Pearl | |
| 5,615,607 A | * | 4/1997 | Delaquis | A47J 36/08 220/372 |

* cited by examiner

*Primary Examiner* — Javier A Pagan

(57) ABSTRACT

A lid system for use with a container having an opening bounded by a rim, with at least one outwardly extending projection extending from the rim, includes a lid and a lid cover member. The lid is sized to seat on the rim of the container and includes an upper surface, at least one section with perforations extending therethrough, and a centrally disposed lid handle. The lid cover member is sized to seat adjacent the upper surface of the lid around the lid handle. The lid cover member is rotatable about the lid handle to substantially close or expose the at least one section with perforations. The lid cover member includes at least one bracket for mating with the at least one outwardly extending projection on the rim of the container to retain the lid on the container during a draining process of the container.

19 Claims, 6 Drawing Sheets

US 11,540,666 B2

COOKING VESSEL LID WITH DRAINING AND STEAM REGULATION FUNCTIONALITY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The present invention pertains to the field of cookware, and more particularly to cookware having a lid with liquid draining and steam regulation functionality.

2. Description of Related Art

The draining of liquids as well as the regulation of the steam generated while cooking food items are fundamental operations commonly performed in the kitchen. Draining is usually performed using utensils such as colanders and strainers specifically designed for this purpose, thus introducing an additional item that requires careful washing and cleaning after being used. The regulation of the steam generated while cooking, however, is usually performed without specially designated utensils by slightly tilting the lid over the cooking vessel lateral wall to create an opening through which the steam can be released, but this operation is ineffective and commonly results in spills and liquids being dripped down the lateral wall of the cooking vessel.

The solutions proposed to overcome these problems can be group in four distinctive groups. The first and second groups correspond to those inventions based on a draining basket inserted inside the cooking vessel and a strainer attached to the cooking vessel inner upper rim once the lid is removed, respectively. Inventions within these two groups leave the needs related to the steam regulation unresolved and target only the draining operation introducing an additional item that requires careful washing and cleaning after used and difficult to secure safely during draining. Inventions within these groups also require the user to possess a considerable amount of strength and dexterity, a limitation that represents a risk of scalding or burning for people with limited hand strength (e.g., older people or anyone suffering from a disability like arthritis).

The third group corresponds to those inventions based on a lid with a downwardly extending skirt with perforated sections that are aligned with spouts or holes in the cooking vessel lateral wall. Since the perforated screen is integrally incorporated in the lid, inventions within this group do not require a third element for draining or steam regulation but this working principle is ineffective for draining or steam regulation because the spouts or holes in the cooking vessel lateral wall can only provide a limited area to perform these operations, furthermore, aligning the perforated screen with the spouts or holes while cooking for steam regulation purposes may result in spills or liquids being dripped down the cooking vessel lateral wall. Securing the lid safely during draining may also be difficult for inventions within this group, and the spouts or perforated holes in the cooking vessel lateral wall represent a significant modification of the cooking vessel for draining and/or steam regulation purposes only.

The fourth group comprises those inventions based on the upper lid having a draining area that is closed or open by a plate. The draining holes may be perforated in the upper lid, in the plate, or in both, depending on the specific invention. The working principle on which the inventions in this group are based has the potential to overcome all previously mentioned limitations: the perforated screen is integrally incorporated in the lid so an additional element for draining or steam regulation is not required; the area that can be used for draining purposes is not a limiting factor as in the case of the inventions within the third group; since the lid rests horizontally on the cooking vessel rim while cooking, opening the draining area for steam regulation purposes would not result in spills; and an effective lid system with draining capabilities may be designed without major modifications of the cooking vessel or lid.

Existing inventions within this group, however, have not been successful in providing a lid draining system with an intuitive and straightforward design not requiring significant modifications of the cooking vessel, easy to clean and operate, and resistant to wear and tear. U.S. Pat. No. 5,615,607 discloses a cooking apparatus adapted to accommodate a lid system comprising an outer cover with perforations for draining purposes, an inner rotatable element to open or close the draining area, and a knob assembly for both handling the lid and rotating the inner element. The lid is locked to the cooking vessel through a pair of brackets located in the pot rim circumferentially extending inwards, a significant modification of the cooking vessel that adversely interferes with its functionality for food may stuck below these elements and the cleaning of the pot becomes more difficult. Furthermore, the knob assembly has a double functionality for handling the lid and rotating the inner element which increases its wear and tear, and it comprises multiple components which adds unnecessary complexity to the lid system and makes its cleaning more difficult.

The cookware lid systems disclosed in U.S. Pat. Nos. 2,026,701 and 1,997,509 consist of a lower plate with perforation for draining purposes, a pivoting upper plate to open or close the draining area, and a knob assembly for both handling the lid and rotating the upper plate. As in the case of U.S. Pat. No. 5,615,607, the knob assembly has a double functionality which increases its wear and tear, and it comprises multiple components which adds unnecessary complexity to the lid system and makes its cleaning more difficult. The lid system in U.S. Pat. No. 2,026,701 lacks a locking mechanism to secure the lid to the pot, while the locking mechanism in U.S. Pat. No. 1,997,509 can not effectively prevent the lid from accidentally detaching from the pot during draining operations.

The present invention is based on a unique and simple design for a cookware lid system with draining and steam regulation capabilities that overcomes all previously mentioned limitations while fulfilling additional objectives: the radially symmetric lid system is easy to use and manufacture, includes an intuitive and visible locking mechanism that provides additional cues to secure the lid to the pot during draining operations, and its radial symmetry guarantees that the lid system is balanced independently of the relative position of its elements.

BRIEF SUMMARY OF THE INVENTION

The present invention can be described as a cookware lid system with draining and steam regulation capabilities. It comprises a round lid with two radially symmetric perforated sections near the edges, a permanently attached central lid handle with a circular base, and a lid cover plate with a central opening that allows it to pivot on the lid surface around the lid cover circular base to cover or expose the lid perforated sections. A couple of radially symmetric projections circumferentially extending outwards in the cooking vessel upper rim and a locking mechanism in the lid cover allow to effectively secure the lid system to the cooking vessel an prevent an accidental detachment during draining operations.

The locking mechanism in the lid cover comprises two integrally formed radially symmetric downwardly extending brackets in the lid cover rim and one flat retainer clip welded to the outer face of the vertical arm in one of the lid cover brackets. In the locked position, the lid is sandwiched between the lid cover and the cooking vessel upper rim while the cooking vessel upper rim projections are inserted in the slots formed between the lid rim and the horizontal arms of the lid cover brackets.

DETAILED DESCRIPTION OF THE INVENTION

Figure 1:
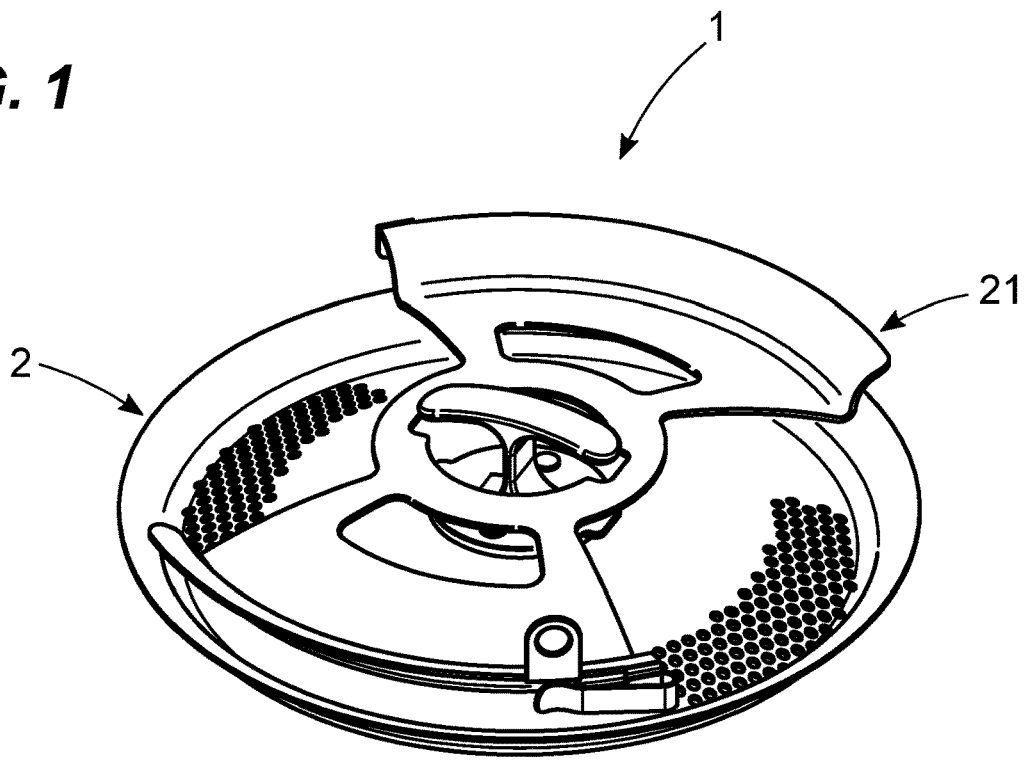
FIG. 1 is a perspective view of the lid system showing the lid and the lid cover. The lid cover is not shown resting on the lid but slightly separated from it to clearly distinguish these two elements of the lid system.
Figure 2:
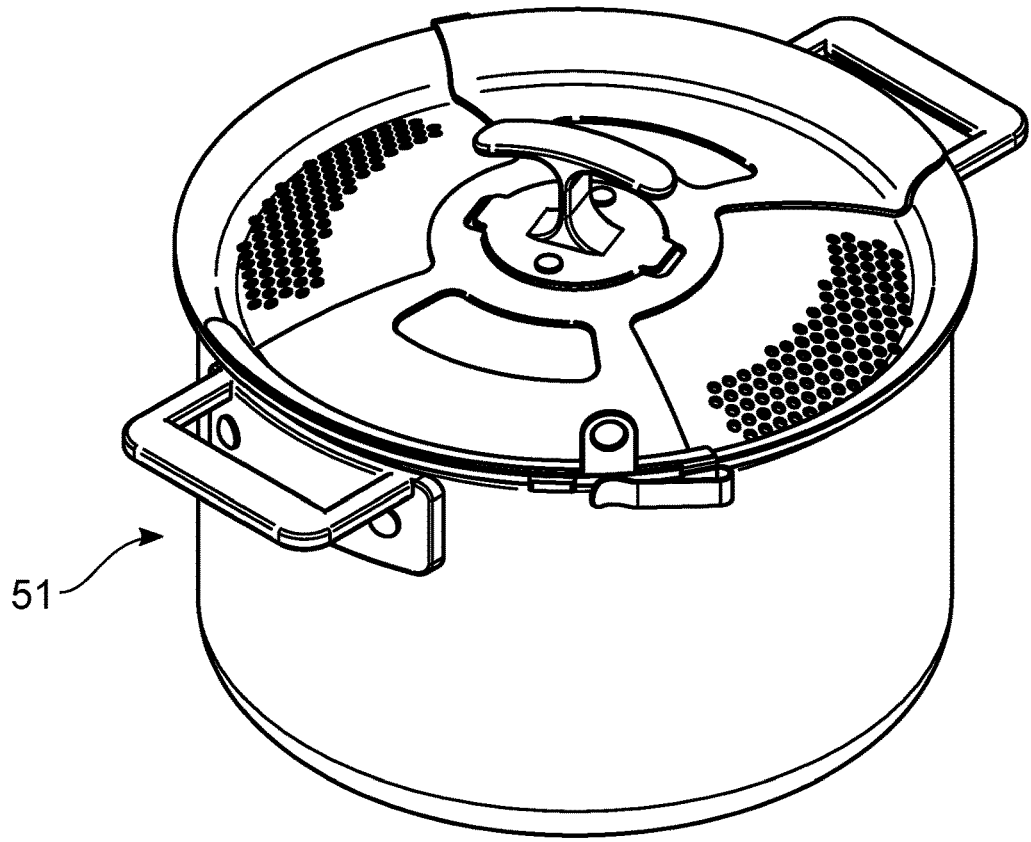
FIG. 2 is a perspective view of the cooking vessel with the lid system unlocked in a position where the lid perforated sections are exposed.

FIG. 1 illustrates the elements of the lid system 1 in a preferred embodiment of the invention: lid 2 with perforated sections, and lid cover 21. To clearly distinguish these two elements, they are shown in FIG. 1 in a position where the lid cover is not resting on the lid but slightly separated from it. FIG. 2 shows the assembled lid system placed on the cooking vessel 51 in the initial position where the lid cover is laid over the lid without being rotated around it and thus leaving the lid perforated sections exposed and the lid system still unlocked to the cooking vessel.

Figure 3:
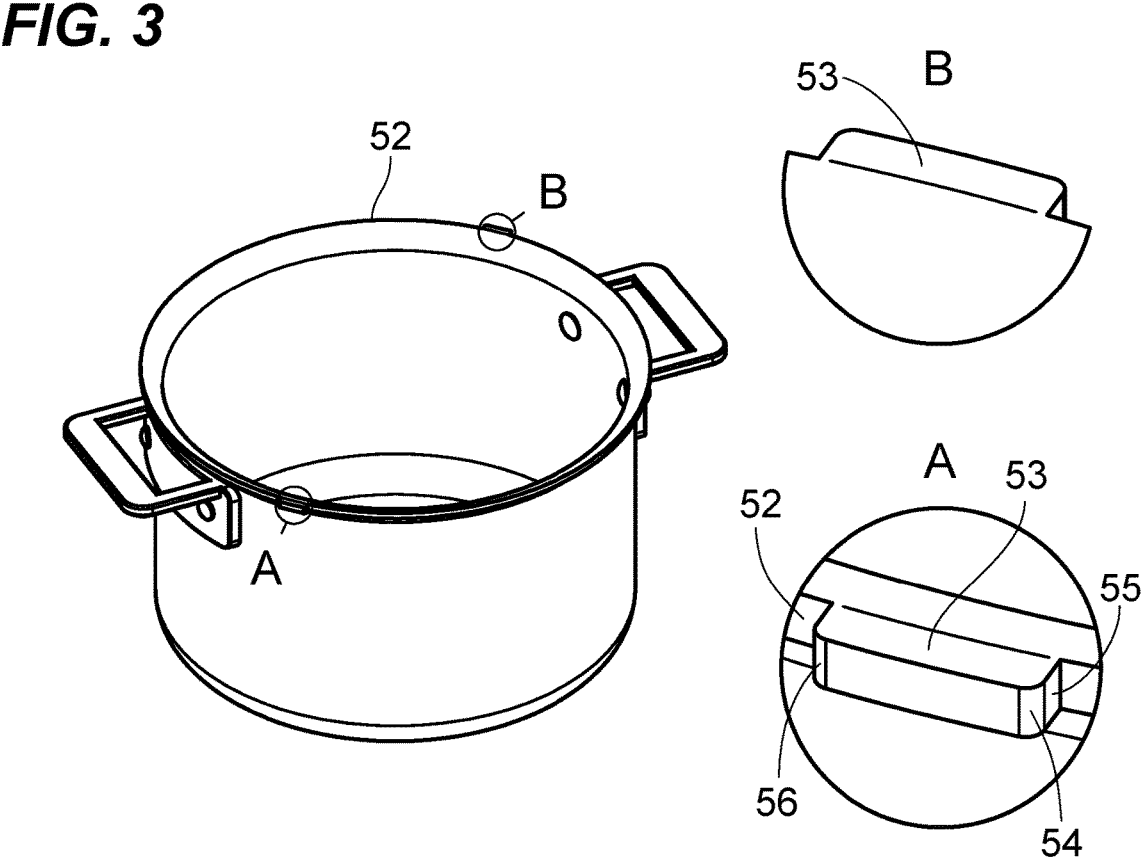
FIG. 3 is a perspective view of the cooking vessel. The figure includes a detail view of each of the two radially symmetric projections circumferentially extending outwards in the cooking vessel upper rim.
Figure 4:
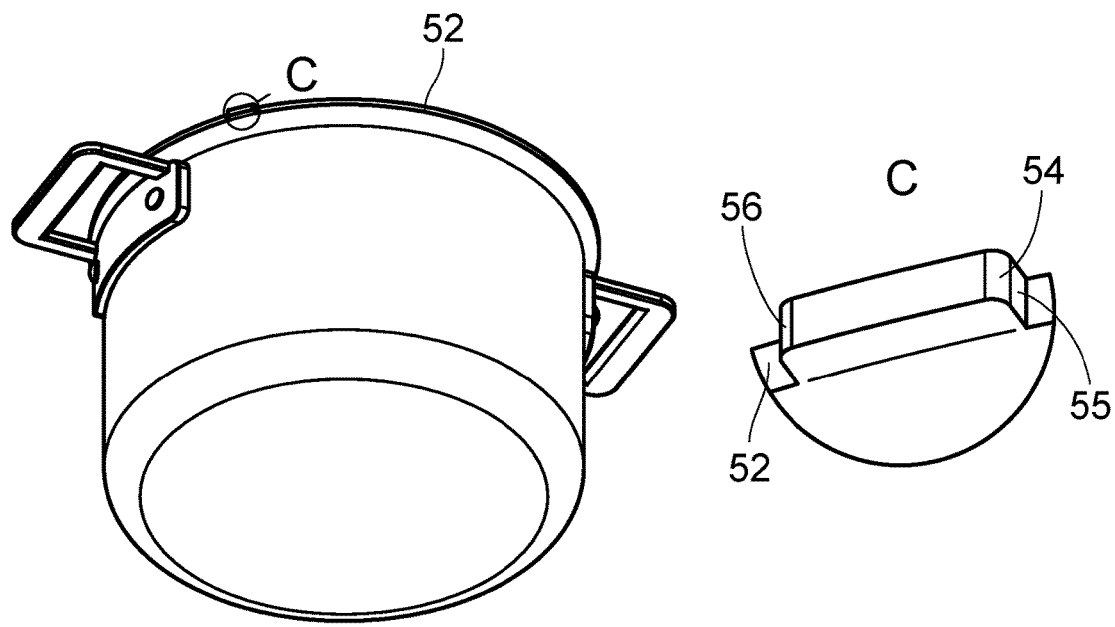
FIG. 4 is a bottom perspective view of the cooking vessel. The figure includes a detail view of one of the two radially symmetric projections circumferentially extending outwards in the cooking vessel upper rim.
Figure 5:
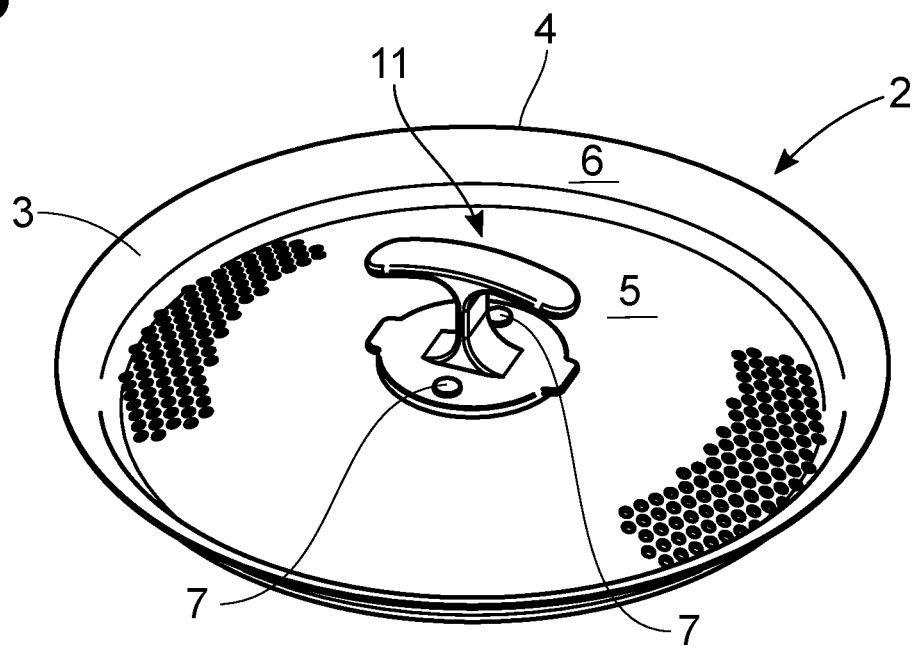
FIG. 5 is a perspective view of the lid including the lid handle and corresponding rivets to permanently attach it to the lid.
Figure 6:
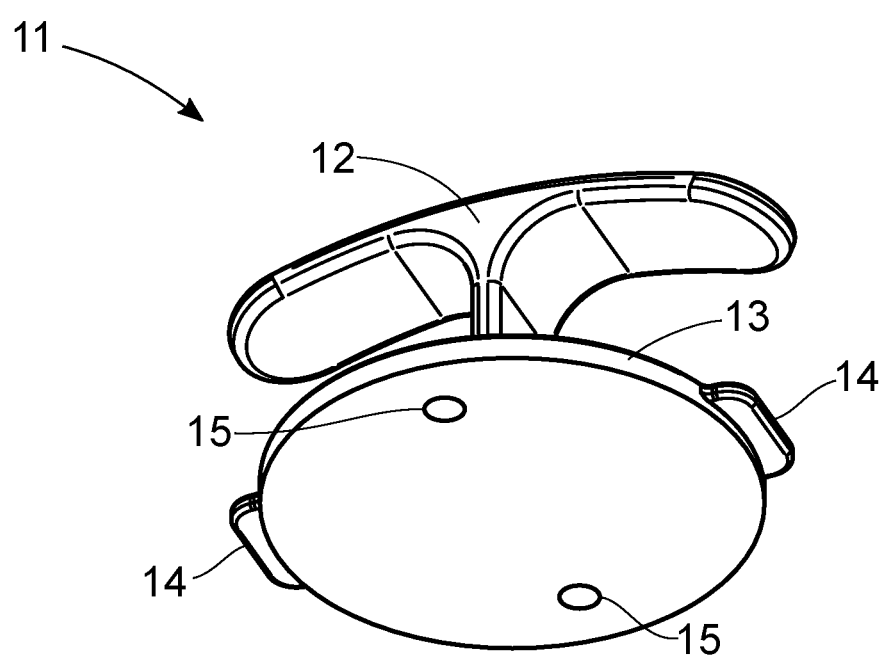
FIG. 6 is a bottom perspective view of the lid handle showing its circular base and the two radially symmetric projections circumferentially extending outwards in the rim of the circular base.
Figure 7:
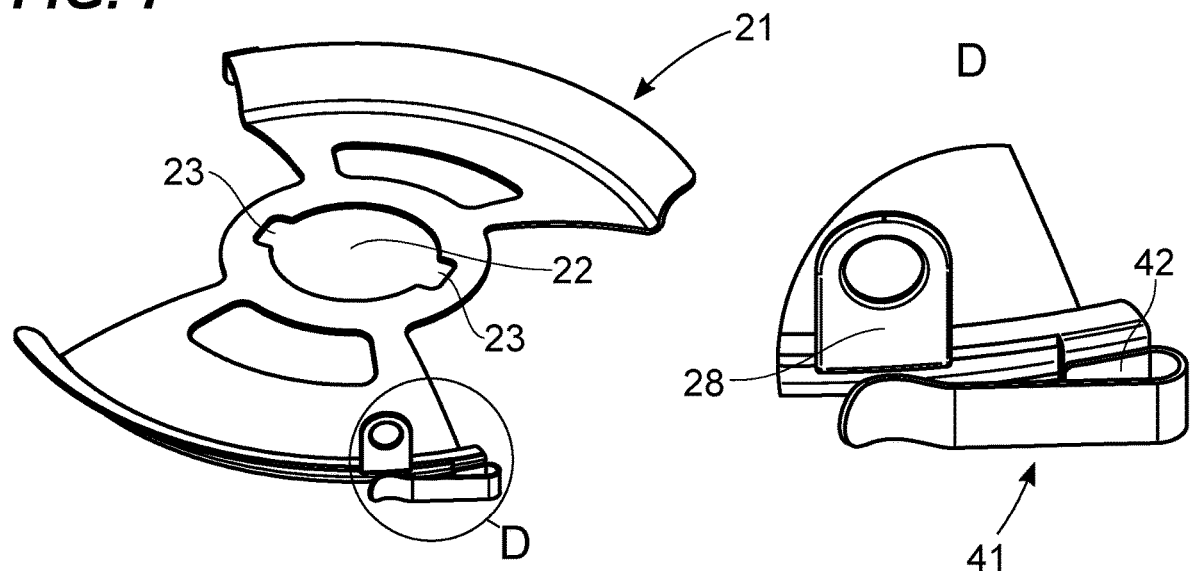
FIG. 7 is a perspective view of the lid cover. The figure includes a detail view of the region including the flat retainer clip and the tab used to rotate the lid cover.
Figure 8:
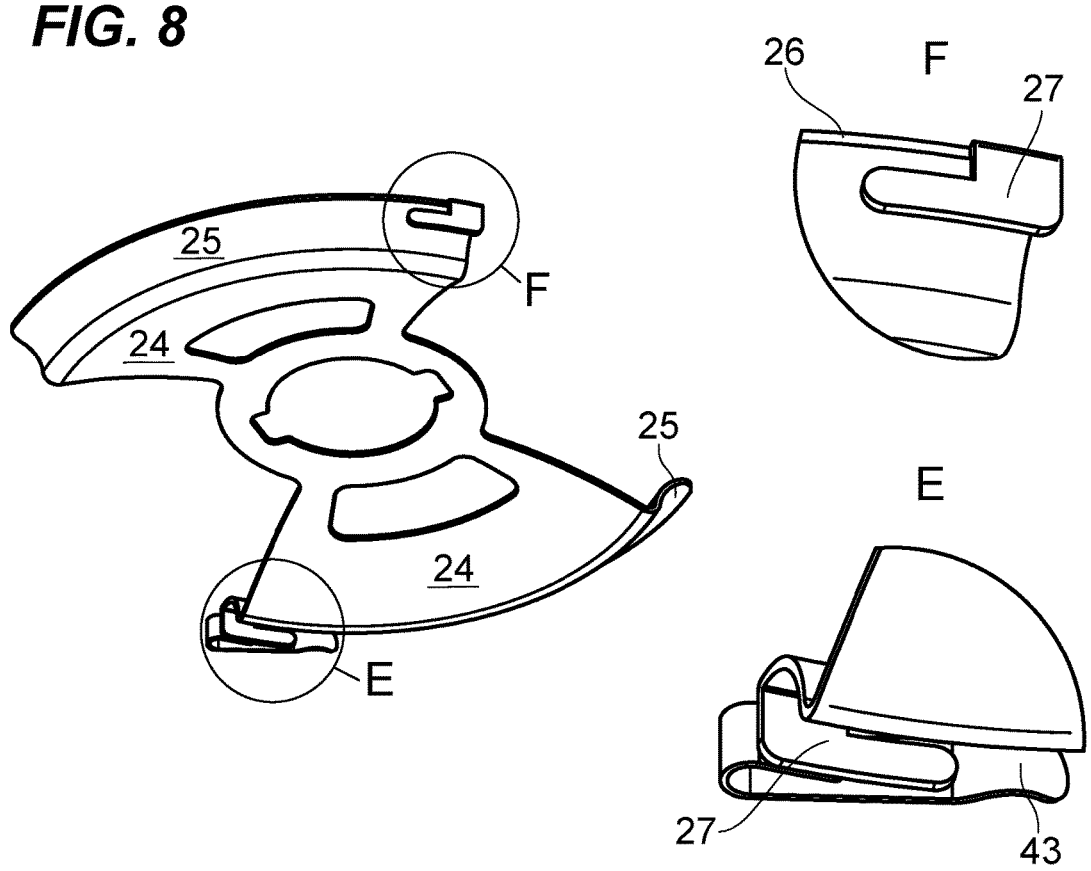
FIG. 8 is a back-bottom perspective view of the lid cover. The figure includes a detail view of each of the integrally formed radially symmetric downwardly extending brackets in the lid cover rim.

FIGS. 3 and 4 and corresponding detail views illustrate the cooking vessel 51 with its two radially symmetric projections 53 circumferentially extending outwards in the cooking vessel upper rim 52. FIG. 5 shows the elements of the lid: lid disk 3 with radially symmetric perforated sections near the edges, lid rim 4, upper convex surface 5 of lid disk center, upper convex surface 6 of lid disk edge, lid handle rivets 7 (other types of fasteners could be used instead of rivets), and lid handle 11. The different parts of the lid handle are illustrated in FIG. 6: handgrip 12, circular base 13, radially symmetric projections 14 circumferentially extending outwards, and rivet holes 15. FIGS. 7 and 8 and corresponding detail views illustrate the elements of the lid cover: central circular opening 22, radially symmetric slots 23, lower concave surface 24 of lid cover center, lower concave surface 25 of lid cover edge, lid cover rim 26, integrally formed radially symmetric downwardly extending brackets 27 in the lid cover, and flat retainer clip 41 welded through its base 42 to the outer face of the vertical arm in one of the lid cover brackets.

Assembling the lid system 1 is a straightforward operation. First the slots 23 located in the lid cover opening 22 are aligned with the projections 14 located in the lid handle base 13 so that the lid handle can pass through the lid cover central opening, and then the lid cover is laid over the lid until the lid cover lower concave surfaces 24 and 25 rest on the lid upper convex surfaces 5 and 6, respectively. From this initial position the lid cover can pivot around the lid handle circular base 13 to cover or expose the lid perforated sections while the projections 14 constraint the pivoting motion of the lid cover to the lid surface. Disassembling the lid system for cleaning purposes only requires lifting the lid cover after aligning the lid cover slots 23 with the projections 14 from the lid handle.

Figure 9:
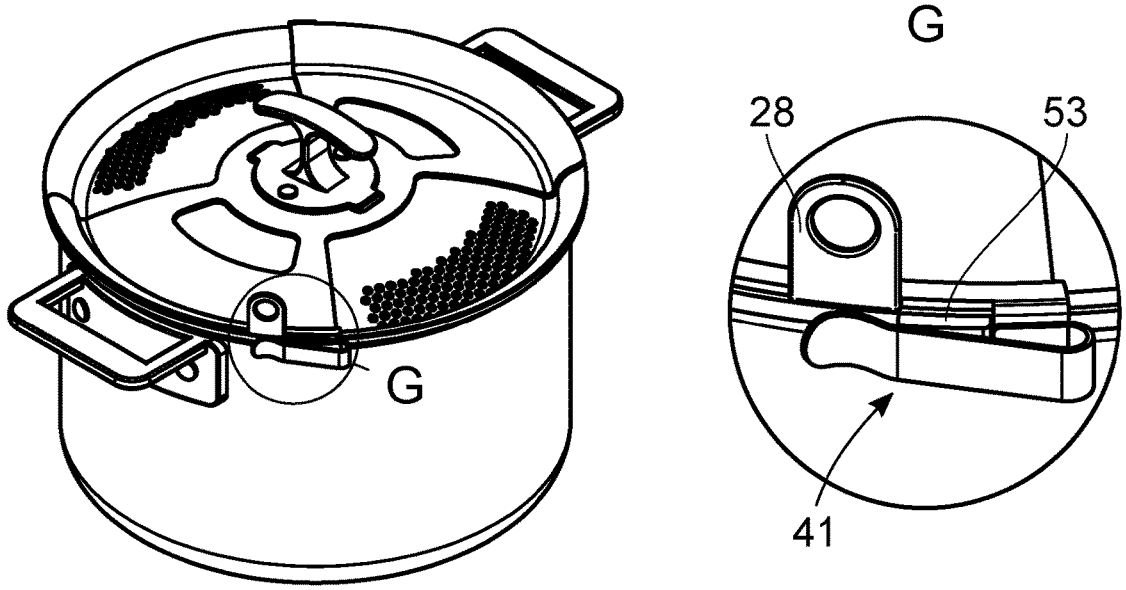
FIG. 9 is a front perspective view of the cooking vessel with the lid system locked in a position where the lid perforated sections are exposed. The figure includes a detail view of the cooking vessel upper rim projection inserted into the slot formed between the lid rim and the lid cover bracket with the flat retainer clip.
Figure 10:
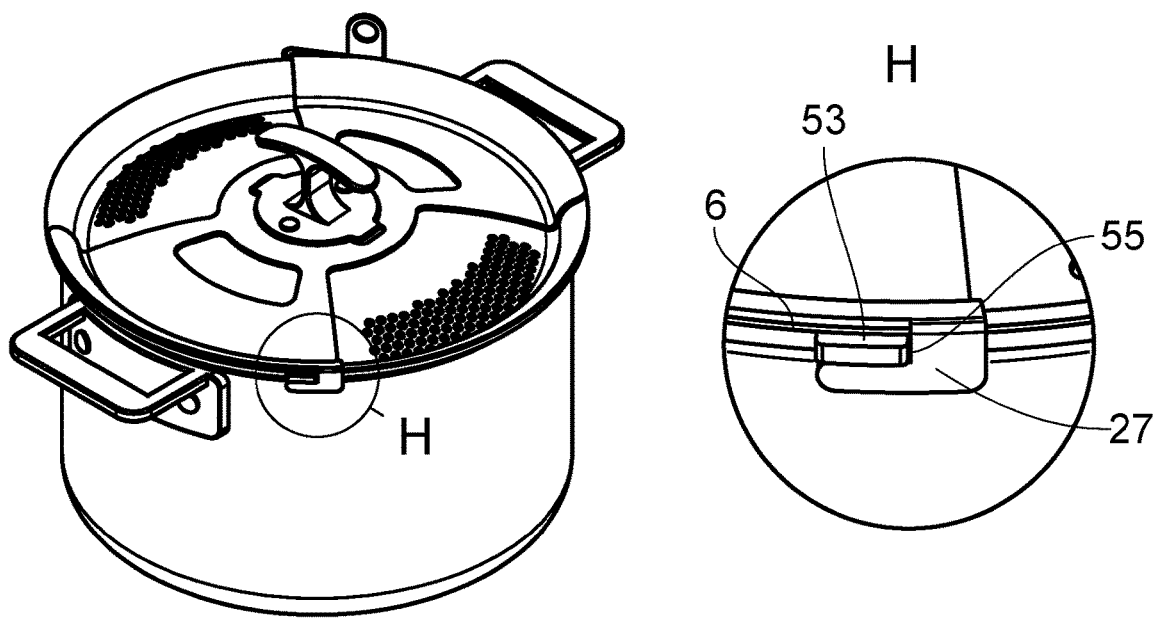
FIG. 10 is a back-perspective view of the cooking vessel with the lid system locked in a position where the lid perforated sections are exposed. The figure includes a detail view of the cooking vessel projection inserted into the slot formed between the lid rim and the lid cover bracket without the flat retainer clip.
Figure 11:
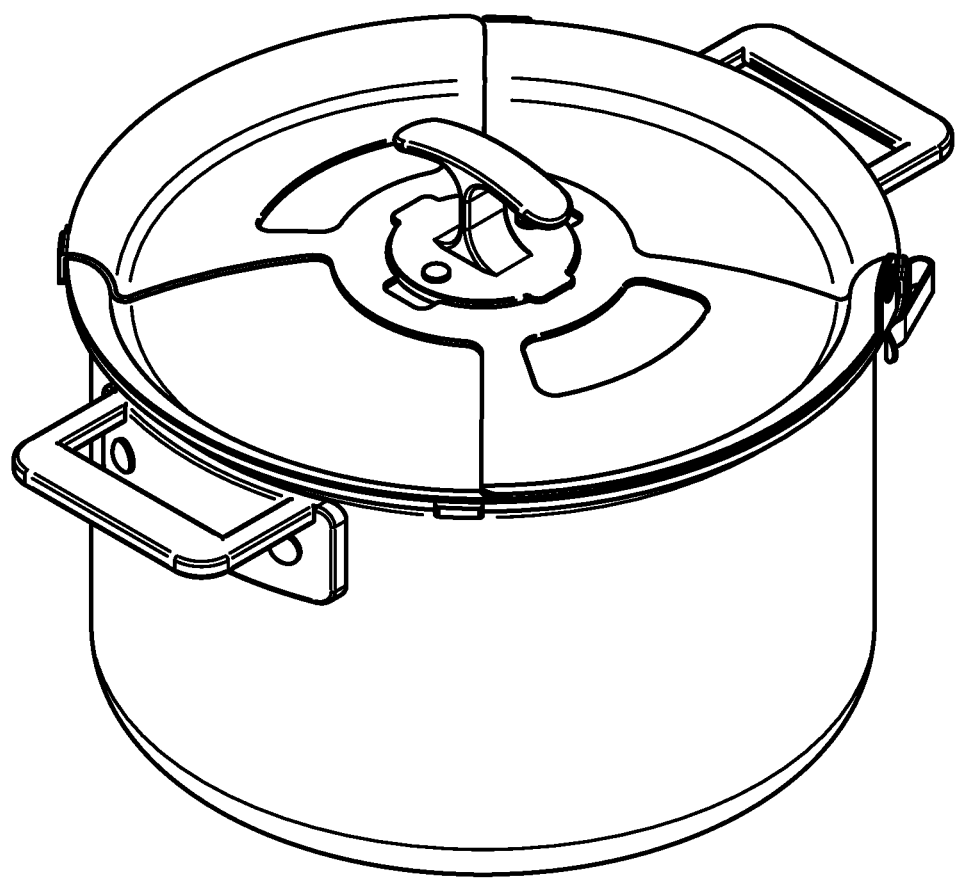
FIG. 11 is a perspective view of the cooking vessel with the lid system unlocked in a position where the lid perforated sections are covered.

Once the lid system is assembled and placed on the cooking vessel the lid and the lid cover can be rotated independently to achieve any desired position. In the position shown in FIG. 11 the lid system is acting as a traditional lid: the lid perforated sections are covered, the lid cover is constrained to the lid surface by the lid handle projections, and the lid system is not locked to the cooking vessel. Starting from the position shown in FIG. 11, the lid cover can be rotated in any direction without locking it to the cooking vessel to exposed slivers of the lid perforated sections as desired and in that way regulate the steam within the cooking vessel. In the positions shown in FIGS. 9 and 10, the lid system can be effectively used as a strainer for draining purposes: the lid perforated sections are completely uncovered, and the lid system is securely locked to the cooking vessel.

The two projections 53 in the cooking vessel upper rim and lid cover locking mechanism comprising the brackets 27 and the flat retainer clip 41 allow to effectively secure the lid system to the cooking vessel. To lock the lid system to the cooking vessel the lid cover is rotated clockwise using the tab 28. Initially the internal convex surface 43 located at the tip of the flat retainer clip engages the convex surface 54 of one of the projections 53 in the cooking vessel upper rim. As the clockwise rotation of the lid cover progresses by pushing or pulling the tab 28 to overcome the opposing force of the flat retainer clip, the flat retainer clip is deflected outwards allowing the projections 53 to be inserted between the lid rim 6 and the horizontal arms of the lid cover brackets which binds the lid system to the cooking vessel upper rim allowing only relative rotational movement between these elements. Once the faces 55 of the projections 53 abut the vertical arms of the lid cover brackets, any further clockwise rotation is prevented at which stage the flat retainer clip returns to its relaxed position enclosing one of the projections 53 and thus preventing the lid cover from also rotating in the opposite direction hence locking the lid system to the cooking vessel and preventing an accidental detachment.

Unlocking the lid system from the cooking vessel requires pushing or pulling the tab 48 counter clockwise so that the flat retainer clip internal convex surface 43 engages the convex surface 56 of the enclosed projection 53 and the flat retainer clip is deflected outwards by overcoming its opposing force until the horizontal arms of the lid cover brackets clear the projections 53 at which stage the lid system can be detached from the cooking vessel.

In a first embodiment, a lid system for use with a container having an opening bounded by a rim, with at least one outwardly extending projection extending from the rim, includes a lid and a lid cover member. The lid is sized to seat on the rim of the container and includes an upper surface, at least one section with perforations extending therethrough, and a centrally disposed lid handle. The lid cover member is sized to seat adjacent the upper surface of the lid around the lid handle. The lid cover member is rotatable about the lid handle to substantially close or expose the at least one section with perforations. The lid cover member includes at least one bracket for mating with the at least one outwardly extending projection on the rim of the container to retain the lid on the container during a draining process of the container.

The lid cover member may include two brackets, each of which is for mating with an outwardly extending projection extending from the rim of the container. The lid cover member may also include a retainer clip coupled to the at least one bracket to aid in retaining the lid on the container during the draining process. The retainer clip may be spring-like. When the lid cover member is rotated around the lid handle, the retainer clip may be movable over and around the projection.

The bracket on the lid cover member may be substantially L-shaped, with part of the L-shape being sized to extend under the projection in close relation thereto when the lid cover member is rotated on the lid. The retainer clip may be coupled to a lid cover bracket.

The lid may be circular in shape and two separate perforated sections may extend through the lid. The perforated sections may be positioned in radially symmetrically opposed relation to one another on the lid near an outer perimeter of the lid. The lid cover member may be shaped to cover both perforated sections at the same time and to expose both perforated sections at the same time.

The lid handle may be permanently attached to the upper surface of the lid. The lid handle may have a circular base. The lid handle may have two radially symmetric protrusions extending outwardly from the circular base thereof. The radially symmetric protrusions are spaced vertically from a bottom of the handle to provide a space below each protrusion.

The lid cover member may have a central opening that is seated over the lid handle. Part of the lid cover member may be positioned under the protrusions to retain the lid cover member on the lid. The lid cover member may rotate on the lid upper surface around the lid to expose the at least one perforated section. The lid cover member may also include vertical member extending upwardly from the lid cover member that permits a user to rotate the lid cover member.

The at least one bracket may be coupled to an outer rim of the lid cover member. The at least one bracket may comprise two brackets that are positioned on opposite sides of the lid cover member. The lid cover member may also include a retainer clip coupled to one of the brackets. The retainer clip may include an upwardly extending member used for rotating the lid cover member. The lid cover member may be plate-like and may have a shape that only partially covers the upper surface of the lid.

In another embodiment, a cookware system includes a container and a lid system. The container has a central opening bounded by an outer perimeter, with a rim associated with the outer perimeter at the upper end of the container. A projection is coupled to and extends outwardly from the rim of the container. The lid system is for coupling to the container and is sized and shaped to seat on the rim of the container. The lid system has a lid, a centrally disposed lid handle, and a lid cover member. The lid cover member has a central opening positioned around the lid handle and is rotatably seated on the lid. The lid has a surface that is partially covered with perforations for draining fluid from the container. The lid cover member has an outer rim shaped to seat over the rim of the lid to retain the lid cover member on the lid. The lid cover member includes a downwardly extending bracket coupled to the rim of the lid cover member for mating with the projection on the rim of the container to retain the lid on the container during a draining process.

The cookware system may also include a retaining clip coupled to the bracket on the lid cover member. The retaining clip may be an arm that springs outwardly against the projection when the lid cover member is rotated on the lid to couple the bracket on the lid cover member to the projection on the container. The retaining clip may extend over and around the projection and bracket when in a locked configuration. The projection may be substantially rectangular in shape and the bracket may be substantially L-shaped and configured to slide under the projection. The retaining clip may be positioned over the bracket. The retaining clip may be spring-like and may extend over and around the projection of the container when the lid cover member is rotated.

The lid may include at least two separate perforated sections on the lid. The lid cover member may be shaped and sized to simultaneously cover the perforated sections or to simultaneously expose the perforated sections.

The lid handle may include two outwardly extending protrusions. The lid cover member central opening may have two outwardly extending recesses for permitting the lid cover member to mate with the lid. The projections of the lid handle may be spaced above a bottom surface of the lid handle such that the lid cover member is rotatably trapped under the protrusions of the lid handle when the lid cover member is rotated.

The lid cover member may be a plate member that only partially covers the upper surface of the lid. The lid cover member may be sized and shaped to close the perforations of the lid. The perforations may be arranged in two separate oppositely positioned sections on the lid, with the lid cover member having two wing-shaped members for covering the perforated sections.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A lid system for use with a container having an opening bounded by a rim with at least one outwardly extending projection extending from the rim, said lid system comprising:
   a lid sized to seat on the rim of the container, said lid including: an upper surface, at least one section with perforations extending therethrough, and a centrally disposed lid handle; and
   a lid cover member sized to seat adjacent the upper surface of the lid around the lid handle, the lid cover member being rotatable about the lid handle to substantially close or expose the at least one section with perforations, said lid cover member including at least one bracket for mating with the at least one outwardly extending projection on the rim of the container to retain the lid on the container during a draining process of the container, further comprising a retainer clip coupled to the at least one bracket to aid in retaining the lid on the container during the draining process, wherein the retainer clip is spring-like and, when the lid cover member is rotated around the lid handle, the retainer clip is movable over around the projection, and the at least one bracket is a lid cover bracket.

2. The lid system of claim 1, wherein the at least one bracket of the lid cover member includes two brackets, each of which is for mating with an outwardly extending projection extending from the rim of the container.

3. The lid system of claim 1, wherein the at least one bracket on the lid cover member is substantially L-shaped, with part of the L-shape being sized to extend under the at least one outwardly extending projection extending from the rim in close relation thereto when the lid cover member is rotated on the lid.

4. The lid system of claim 1, wherein the lid is circular in shape and the at least one section with perforations extending therethrough is two separate perforated sections that extend through the lid, with the perforated sections being positioned in radially symmetrically opposed relation to one another on the lid near an outer perimeter of the lid, and the lid cover member is shaped to cover both perforated sections at the same time and to expose both perforated sections at the same time.

5. The lid system of claim 1, wherein the lid cover member is plate-like and has a shape that only partially covers the upper surface of the lid.

6. A cookware system comprising:
   a container having a central opening bounded by an outer perimeter, with a rim associated with the outer perimeter at an upper end of the container;
   a projection coupled to and extending outwardly from the rim of the container;
   a lid system according to claim 1.

7. The cookware system of claim 6, wherein the projection is substantially rectangular in shape and the bracket is substantially L-shaped and configured to slide under the projection.

8. The cookware system of claim 7, wherein the retaining clip extends over and around the projection of the container when the lid cover member is rotated.

9. The cookware system of claim 6, wherein the at least one section with perforations comprises at least two separate perforated sections which are provided on the lid, with the lid cover member being shaped and sized to simultaneously cover the perforated sections or to simultaneously expose the perforated sections.

10. The cookware system of claim 6, wherein the lid handle includes two outwardly extending protrusions and wherein the lid cover member has a central opening; the lid cover member central opening having two outwardly extending recesses for permitting the lid cover member to mate with the lid, with the projections of the lid handle being spaced above a bottom surface of the lid handle such that the lid cover member is rotatably trapped under the protrusions of the lid handle when the lid cover member is rotated.

11. A lid system for use with a container having an opening bounded by a rim with at least one outwardly extending projection extending from the rim, said lid system comprising:
   a lid sized to seat on the rim of the container, said lid including: an upper surface, at least one section with perforations extending therethrough, and a centrally disposed lid handle; and
   a lid cover member sized to seat adjacent the upper surface of the lid around the lid handle, the lid cover member being rotatable about the lid handle to substantially close or expose the at least one section with perforations, said lid cover member including at least one bracket for mating with the at least one outwardly extending projection on the rim of the container to retain the lid on the container during a draining process of the container, wherein the lid handle is permanently attached to the upper surface of the lid, the lid handle has a circular base, and the lid handle has two radially symmetric protrusions extending outwardly from the circular base, with the radially symmetric protrusions being spaced vertically from a bottom of the handle to provide a space below each protrusion.

12. The lid system of claim 11, wherein the lid cover member has a central opening that is seated over the lid handle and part of the lid cover member is positioned under the protrusions to retain the lid cover member on the lid, and the lid cover member rotates on the lid upper surface around the lid to expose the at least one perforated section, and further comprising a vertical member extending upwardly from the lid cover member that permits a user to rotate the lid cover member.

13. The lid system of claim 11, further comprising a retainer clip coupled to the at least one bracket to aid in retaining the lid on the container during the draining process, wherein the retainer clip is coupled to the lid cover bracket.

14. The lid system of claim 13, wherein the retainer clip is spring-like and, when the lid cover member is rotated around the lid handle, the retainer clip is movable over and around the projection.

15. The lid system of claim 11, wherein the lid is circular in shape and the at least one section with perforations extending therethrough is two separate perforated sections that extend through the lid, with the perforated sections being positioned in radially symmetrically opposed relation to one another on the lid near an outer perimeter of the lid, and the lid cover member is shaped to cover both perforated sections at the same time and to expose both perforated sections at the same time.

16. A lid system for use with a container having an opening bounded by a rim with at least one outwardly extending projection extending from the rim, said lid system comprising:
  a lid sized to seat on the rim of the container, said lid including: an upper surface, at least one section with perforations extending therethrough, and a centrally disposed lid handle; and
  a lid cover member sized to seat adjacent the upper surface of the lid around the lid handle, the lid cover member being rotatable about the lid handle to substantially close or expose the at least one section with perforations, said lid cover member including at least one bracket for mating with the at least one outwardly extending projection on the rim of the container to retain the lid on the container during a draining process of the container,
  wherein the at least one bracket is coupled to an outer rim of the lid cover member and the at least one bracket comprises two brackets that are positioned on opposite sides of the lid cover member, and further comprising a retainer clip coupled to one of the brackets, said retainer clip including an upwardly extending member used for rotating the lid cover member.

17. The lid system of claim 16, further comprising a retainer clip coupled to the at least one bracket to aid in retaining the lid on the container during the draining process, wherein the retainer clip is coupled to the lid cover bracket.

18. The lid system of claim 17, wherein the retainer clip is spring-like and, when the lid cover member is rotated around the lid handle, the retainer clip is movable over and around the projection.

19. The lid system of claim 16, wherein the lid is circular in shape and the at least one section with perforations extending therethrough is two separate perforated sections that extend through the lid, with the perforated sections being positioned in radially symmetrically opposed relation to one another on the lid near an outer perimeter of the lid, and the lid cover member is shaped to cover both perforated sections at the same time and to expose both perforated sections at the same time.

* * * * *